March 24, 1959 P. E. R. FAUVELOT 2,878,638
SOUND-PROOF AND SHOCK ABSORBING BEARING FOR PRECISION MECHANISMS
Filed July 18, 1957 2 Sheets-Sheet 1

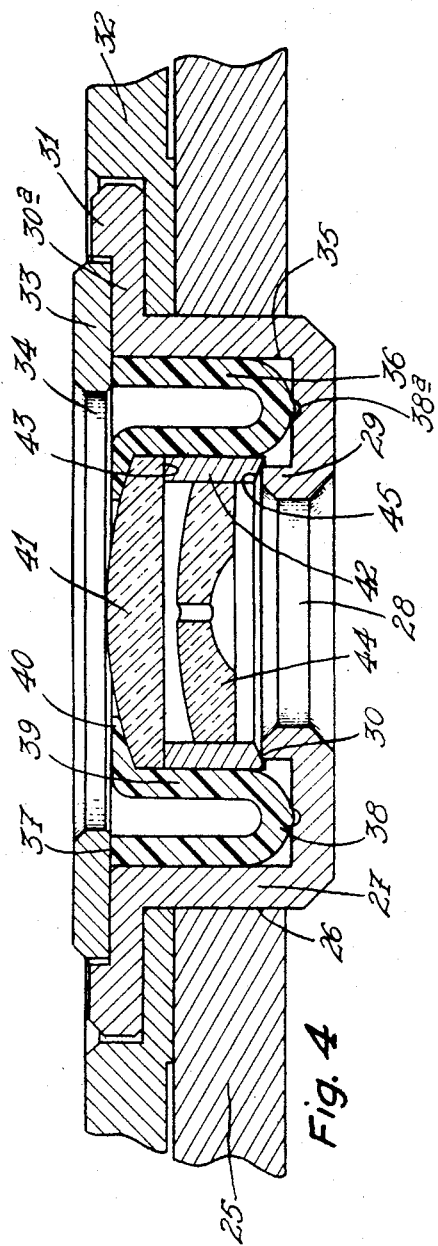
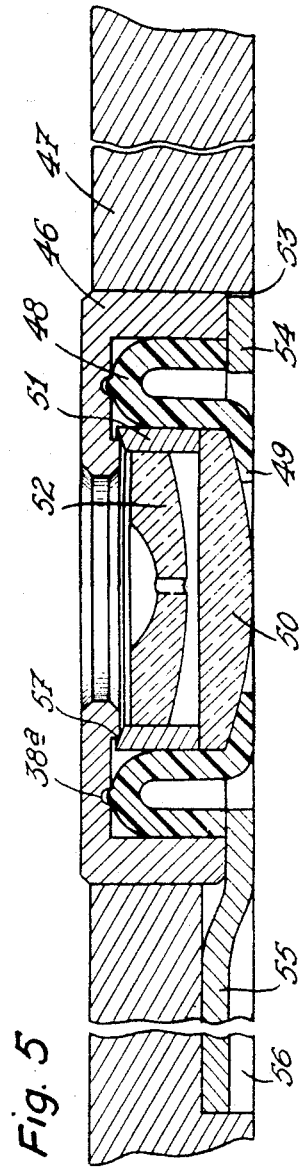
Fig. 4
Fig. 5

United States Patent Office 2,878,638
Patented Mar. 24, 1959

2,878,638

SOUND-PROOF AND SHOCK ABSORBING BEARING FOR PRECISION MECHANISMS

Pierre Ernest René Fauvelot, Ville d'Avray, France, assignor to Etablissements Ed. Jaeger, Levallois-Perret, Seine, France Application July 18, 1957, Serial No. 672,694

Claims priority, application France July 20, 1956

6 Claims. (Cl. 58—140)

This invention relates to sound-proof and shock absorbing bearings.

This invention has for an object the provision of an improved sound-proof and shock absorbing bearing for precision mechanisms such as clockworks; the bearing preferably has a support made of resiliently deformable and sound-proof material, interposed between an anti-friction or rolling fitting and the framework of the associated mechanism, this material being preferably a synthetic plastic.

In a preferred embodiment, particularly for the bearings of a watch balance wheel, the support has the shape of a cup, the bottom of which is provided with a hollow bulge, to receive the stone and the counter-pivot of the mechanism, said cup being inserted into a cage held in a corresponding plate.

The bulge at the bottom of the cup maintains by a resilient fit said bearing and said counter-pivot, spaced from each other by an annular flange.

In another embodiment, the counter-pivot is held by an edge of the bulge at the bottom of the cup, said bulge having itself an open bottom.

Such an arrangement facilitates visual inspection and easy dismantling of the counter-pivot.

In order to insure a better centering, the stone forming part of the bearing is driven into a collar, which ends, on the counter-pivot side, in an annular flat surface, against which is applied the flat face of said counter-pivot, while the bulging side thereof receives the flexible annular edge limiting the open bottom of the bulge. The other extremity of the collar is made as a truncated conically shaped surface, which contacts the circular edge limiting an inner bulge of the supporting cage of the resilient cup like member.

In this way the centering of the bearing in relation to the cage is mechanically insured, as is the mutual positioning of the bearing and the counter-pivot.

The following description with reference to the accompanying drawings given as an example, without limiting the scope of the invention, will provide a better understanding of the practical realisation of said invention.

In the drawings:

Fig. 4 shows in section and on a very large scale the support of the bearing of a watch balance wheel, seen from the regulating system side, but in another embodiment.

Fig. 5 shows also in section the support of the opposite bearing in the embodiment of Fig. 4.

Figure 1:
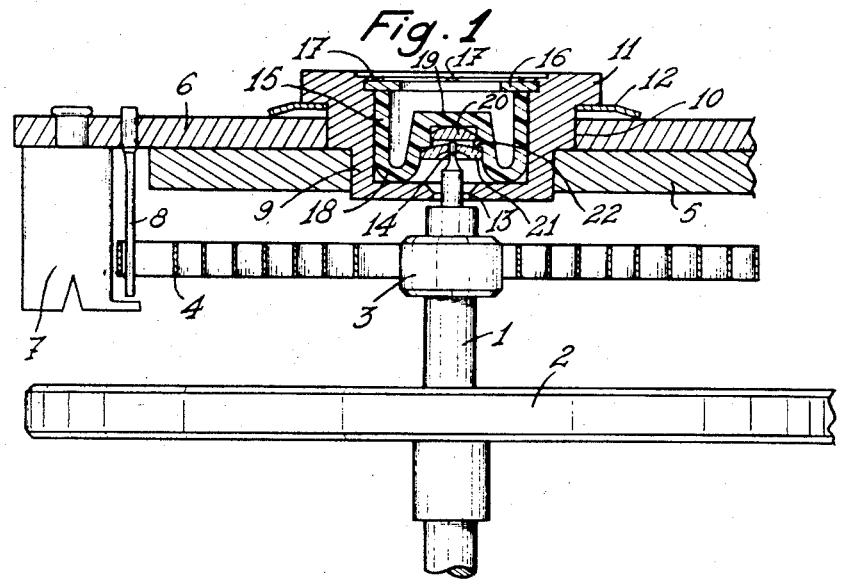
Fig. 1 shows in section the support of the bearing of a watch balance wheel seen from the side of the regulating system.

As illustrated in Fig. 1, the pivot 1 of a balance wheel 2 of a clockwork mechanism is integral with the central collar 3, to which is attached the inner extremity of the helicoidal spring 4. The cock 5 supports the regulating lever or index 6, which carries in a known manner a key 7 and a curb pin 8, between which passes the outer extremity of said spring. The cock 5 has driven into it a setting 9 forming a cage, this setting centering the regulating lever 6 by means of a shoulder 10, located above the cock and resiliently maintaining said regulating lever by means of a shoulder 11, under which is inserted a resilient cambered blade 12.

The bottom of the cage 9 has a perforation 13, which surrounds with a slight clearance, for safety purposes, the corresponding extremity of pivot 1, this extremity ending in a small rod 14.

In the inner space of cage 9 is inserted a member 15, made of a resiliently deformable and sound-proof material, such as natural or synthetic rubber or synthetic plastic material. This member 15 is shaped as a cup, the side wall of which follows the inner periphery of the inner recess of cage 9. The upper edge of this cup-shaped member 15 abuts a washer 16 inserted into cage 9 and centered by means of a shoulder, said washer being maintained by flaps 17 provided on the cage.

The bottom of the cup-shaped member 15 is constituted by a round off 18, which is torus-shaped and tangentially applied to the bottom of the cage recess, thus forming a hollow bulge 19. This inner bulge is provided, in an inner recess, with a flat faced stone 20, acting as a counter-pivot, said stone being inserted into and by resilient deformation of the member 15. This stone 20 is associated with another stone 21, through which passes the small rod 14, inserted in a similar way in the recess of bulge 19. Both these stones are kept apart from one another by a flange 22, arranged in the recess of the bulge 19.

Figure 2:
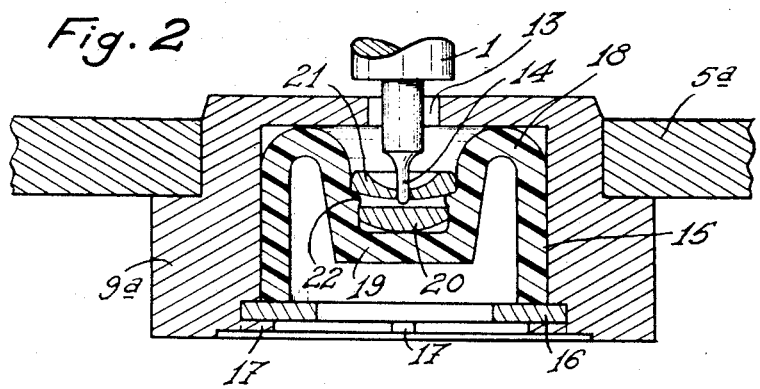
Fig. 2 shows also in section and on a larger scale the support of the bearing opposite of the said regulating system.
Figure 3:
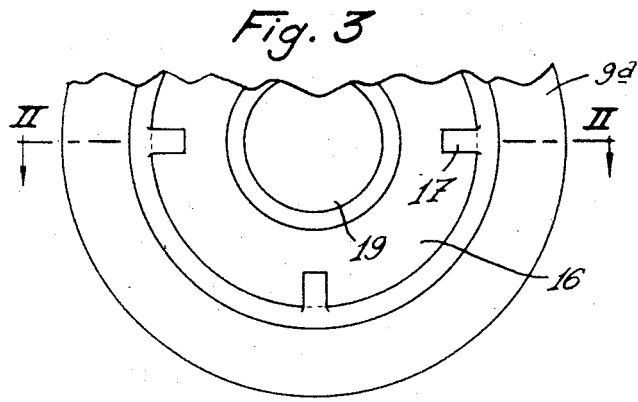
Fig. 3 is a partial view from below of the support of Fig. 2.

As may be seen in Fig. 2, the bearing opposite the regulating system in Fig. 1 comprises the same elements, like numerals being used for similar parts. The only difference lies in the shape of the cage 9a, which has only one shoulder, and which is driven into the plate 5a opposite the cock.

As may be seen in Fig. 4, the cock 25 of the clockwork mechanism has, driven into its perforation 26, a cage 27, the bottom of which has a perforation 28, through which will pass the pivot of the balance wheel. This perforation 28 is surrounded by an edge ring 29 bulging above the inner face of the bottom, said edge ring being limited on the outside by a circular edge 30. The border of the cage 27 is integral with an annular border 30a, itself limited by a flange 31. This border 30a holds the regulating lever 32 through a easy friction fit on the cock 25. A flat ring 33 is pressed onto the border 30a within a recess in the flange 31, said ring having an inner perforation 34 of a lesser diameter than the inner diameter 35 of the cage 27. The ring 33 is maintained within the cage by means of evenly and normally disposed screws, these not being shown.

The inner diameter 35 of the cage holds in place a cup-shaped member 36 made of a sound-proof and resilient plastic material. This cup-shaped member has a cylindrical outer wall, pressed by its edge 37 under the ring 33. This cylindrical edge 36 is coupled by means of a half-torus-shaped element 38 with an inner cylindrical bulge 39 ending on the inside in a bevel 40, facing the recess 34. The half-torus-shaped element is pressed against a centering groove 38a, into which the plastic material partly penetrates.

The bevel 40 holds the stone 41, which has its bulging outer face applied under the bevel, and the inner surface of which is plane. This stone is inserted just inside of the flange 39.

A collar 42 is likewise inserted into the bulge 39 and this collar contacts from below the flat face of the stone 41, by a flat border 43. A bored stone 44, acting as a bearing, has been previously driven into the collar 42. The border 45 facing this collar is shaped as a truncated cone, the small base of which is directed inwards of the collar. This truncated cone is supported by the annular border 30.

As may be seen in Fig. 5, the pivoting system, facing the one described above, comprises a cage 46, driven into the corresponding perforation of the movement plate 47, which is in turn opposite the cock 25. This cage 46 supports identical elements, i.e. a cup-shaped member 48 made of resilient material with a bevel 49 holding the counter-pivot 50 and the collar 51 into which is driven the bearing 52. As this pivoting system is not needed for holding a regulating lever, the cage 46 is of a lesser height and has no border. On the contrary, it is pushed into a recess 53, into which is placed a ring 54 ending in a radial tail piece 55. This tail piece is inserted into an inner socket 56 in the plate 47 and held therein by screwing means. The ring 54 holds the border of the cup-shaped member 48 as did the ring 33 for the border 36. The height of the cup-shaped member 48 is a lesser one, the same being the case for the collar 51. This collar centers the bearing on the border 57, identically to the border 30, and is applied under the counter-pivot 50. The half-torus-shaped part of the cup-shaped member 48 is also centered in a groove with a semi-circular section, identical to the groove 38a.

The cup-shaped members 38 and 48 are preferably made out of sheets of thermo-plastic material, having gone through a heating treatment by infra-red radiations; this treatment could be applied before cutting and punching the sheets into shape. The material can be polyethylene.

The resiliency of the bevels 40 and 49 permits the removal and reinsertion in place of the counter-pivots 40 or 50, for verification and lubricating purposes. Submitted to an axial or radial shock, the cup-shaped members are deformed but resume their former position because of their resiliency. The aligning of the bearings remains automatically insured through the support offered by the truncated conically shaped surfaces 45 on the corresponding borders 30 or 57. The surfaces of the counter-pivots remain adequately perpendicular to the axes of the bearings, because of the support offered by the faces of the collars.

This kind of design can be used even on minute sized mechanisms, the realization being a very simple one, and said mechanisms are endowed with a great resistance against shocks.

It is to be understood that, without departing from the scope of the invention as set forth in the accompanying claims, variations can be made in the described embodiments. In particular, the shape of the support of the bearing and the sound-proof and resilient material used for the construction can be altered in accordance with actual requirements. Other devices than stones can be used to diminish friction, such as smooth rings or bearings. The uses of the invention are not limited to the support of balance wheel pivots, but can be applied to any pivots in like precision mechanisms.

What I claim is:

1. A shock absorbing and sound-proof bearing for a pivot of a precision mechanism, the bearing comprising a stationary cage having a recess the bottom of which defines a perforation through which the pivot passes, a member of a resiliently deformable and sound-proof material, frictionally engaged in said recess against the bottom thereof and having a substantially cylindrical central chamber opening at one end towards the recess bottom and at least partially closed at its opposite end, an anti-friction fitting for the pivot engaged in said chamber by resilient deformation of said member, and means engaging and holding said member within said cage recess, the cage recess being cylindrical and the resiliently deformable and sound-proof member comprising a substantially cylindrical outer wall, an inner hollow bulge including and limited by a substantially cylindrical wall coaxial with and surrounded by said outer wall and including and limited by an at least partially closed bottom in order to define a central chamber, and a torus-shaped round off portion interconnecting said walls and bearing on the cage recess bottom.

2. A bearing according to claim 1, wherein the bottom of the cage recess defines a centering groove which faces the torus-shaped round off portion of the resiliently deformable and sound-proof member and engages a part of said torus-shaped round off portion.

3. A shock absorbing and sound-proof bearing for a pivot of a clockwork, comprising a stationary cage supported by the clockwork and having a cylindrical recess the bottom of which defines a perforation through which the pivot passes, a cup-shaped member of a resiliently deformable and sound-proof material, frictionally inserted in said recess against the bottom thereof, said cup-shaped member comprising a substantially cylindrical outer wall, an inner hollow bulge including and limited by a substantially cylindrical wall coaxial with and surrounded by said outer wall and including and limited by an at least partially closed bottom in order to define a central chamber, and a torus-shaped round off portion interconnecting said walls and bearing on the cage recess bottom, a bored stone through which passes one end of the pivot, a counter-pivot, said bored stone and counter-pivot being housed in said central chamber, means engaging and securing said bored stone and counter-pivot to one of the cylindrical walls of said chamber, means for spacing said bored stone and said counter-pivot, and means engaging and holding said cup-shaped member within said cage recess.

4. A bearing according to claim 3, wherein the counter-pivot is engaged in the central chamber by resilient deformation of one of the cylindrical walls with said counter-pivot bearing against the chamber bottom, and wherein the means for securing the bored stone to said chamber cylindrical wall and for spacing the same comprise a collar engaged in the central chamber by resilient deformation of said one cylindrical wall, the collar including a flat end adapted to bear against the counter-pivot, means for holding said collar within said chamber, and a bored stone engaged in said collar, the cage bottom including an annular border projecting inside the cage recess and the outer diameter of which is comprised between the inner and outer diameters of the collar, and wherein the end of the collar opposite to the flat end thereof has the shape of a truncated cone the small base of which is directed inwards of the collar, the latter said end bearing on the outer edge of said border thereby axially holding said collar while acting as centering means for said collar.

5. A bearing according to claim 3, wherein the bottom of the cage recess defines a centering groove which faces the torus-shaped round off portion of the cup-shaped member and engages a part of said torus-shaped round off portion.

6. A bearing according to claim 3, wherein the means for axially holding the cup-shaped member comprises a washer-like member including an outer radial projection and an inner diameter substantially equal to that of the outer cylindrical wall of said cup-shaped member, said washer-like member engaging the clockwork, and means for securing said outer radial projection to said clockwork.

(References on following page)

References Cited in the file of this patent

UNITED STATES PATENTS

| | | |
|---|---|---|
| 1,440,059 | Colomb | Dec. 26, 1922 |

FOREIGN PATENTS

| | | |
|---|---|---|
| 230,295 | Switzerland | Mar. 16, 1944 |
| 232,946 | Switzerland | Sept. 16, 1944 |
| 243,388 | Switzerland | Jan. 3, 1947 |
| 260,358 | Switzerland | July 6, 1949 |
| 281,031 | Switzerland | June 3, 1952 |
| 296,070 | Switzerland | Apr. 1, 1954 |
| 306,692 | Switzerland | July 1, 1955 |